United States Patent [19]

Schirmer et al.

[11] E Re. 31,392

[45] Reissued Sep. 27, 1983

[54] ARRANGEMENTS FOR ELECTRONICALLY DETERMINING AND ADJUSTING THE IGNITION TIME OF AN INTERNAL COMBUSTION ENGINE

[75] Inventors: Günter Schirmer, Leinfelden; Edwin Fauser, Sersheim; Leo Steinke, Hegnach, all of Fed. Rep. of Germany

[73] Assignee: Robert Bosch GmbH, Stuttgart, Fed. Rep. of Germany

[21] Appl. No.: 932,453

[22] Filed: Aug. 10, 1978

Related U.S. Patent Documents

Reissue of:

[64] Patent No.: 3,756,212
Issued: Sep. 4, 1973
Appl. No.: 125,476
Filed: Mar. 18, 1971

U.S. Applications:

[63] Continuation of Ser. No. 822,691, Aug. 8, 1977, abandoned.

[30] Foreign Application Priority Data

Mar. 21, 1970 [DE] Fed. Rep. of Germany ..... 2013703

[51] Int. Cl.[3] ..... F02P 5/00

[52] U.S. Cl. ..... 123/612; 123/418; 123/414; 123/415; 123/146.5 A

[58] Field of Search ..... 123/148 E, 146.5 A, 123/148 DC, 414, 415, 418, 612, 617; 315/209 M; 324/16 T

[56] References Cited

U.S. PATENT DOCUMENTS

| | | | |
|---|---|---|---|
| 1,861,417 | 5/1932 | Klaiber | 123/146.5 A |
| 3,202,146 | 8/1965 | Short et al. | 123/148 E |
| 3,202,146 | 8/1965 | Short et al. | 123/148 E |
| 3,291,108 | 12/1966 | Schneider et al. | 123/148 E |
| 3,314,407 | 4/1967 | Schneider | 324/16 T |
| 3,434,462 | 3/1969 | Schneider et al. | 123/148 E |
| 3,454,871 | 7/1969 | Nolting | 324/16 R |
| 3,559,629 | 2/1971 | Sauvignet | 123/148 E |
| 3,563,219 | 2/1971 | Mieras | 123/148 E |
| 3,587,551 | 6/1971 | Harrow | 123/148 E |
| 3,783,850 | 1/1974 | Habert | 123/148 E |
| 3,799,136 | 3/1974 | Korteling | 123/146.5 A |

FOREIGN PATENT DOCUMENTS

| | | | |
|---|---|---|---|
| 1934110 | 1/1970 | Fed. Rep. of Germany | 123/148 E |

*Primary Examiner*—Parshotam S. Lall
*Attorney, Agent, or Firm*—Michael J. Striker

[57] ABSTRACT

The signals of one or more engine operating parameters, such as r.p.m. and throttle valve vacuum are altered by function generators to correspond to the desired relationship between ignition timing and the parameters that are taken into account. These altered signals are added together and conducted to a comparator that receives as a second input a time and r.p.m. dependent signal from a saw tooth generator, the output of the comparator being fed to the ignition device.

13 Claims, 4 Drawing Figures

ARRANGEMENTS FOR ELECTRONICALLY DETERMINING AND ADJUSTING THE IGNITION TIME OF AN INTERNAL COMBUSTION ENGINE

Matter enclosed in heavy brackets [ ] appears in the original patent but forms no part of this reissue specification; matter printed in italics indicates the additions made by reissue.

*This is a continuation, of application Ser. No. 822,691, filed Aug. 8, 1977, now abandoned, which is a reissue of Ser. No. 125,476, filed Mar. 18, 1971, and Pat. No. 3,756,212.*

BACKGROUND OF THE INVENTION

The invention relates to arrangements for electronically determining and adjusting the ignition timing of an internal combustion engine, in dependence on operating parameters of the engine, particularly the engine r.p.m. and/or the throttle valve vacuum.

Conventional ignition timers built into vehicles adjust the timing in dependence on the engine r.p.m. and on the throttle valve vacuum and in accordance with a special curve for each engine design.

The most favorable curve must be determined by experiments that require a large number of experimental ignition distributors during the course of design and development of the engine.

SUMMARY OF THE INVENTION

An object of the invention is to provide arrangements for determining the ignition point electrically whereby the lapse of time between top dead center and the moment of generation of the ignition spark can be electrically adjusted.

Another object of the invention is the arrangements of the previous object, which arrangements enable the aforesaid adjustment to be made in accordance with any adjustable characteristic curve, which curve can be tested on the test stand or on the road and, if necessary, immediately corrected.

Briefly, the invention consists of pickup means for providing at least one signal corresponding to an engine operating parameter, a respective function generator with an adjustable characteristic connected to receive as input the signal for altering the input so as to provide as output an electric signal that corresponds to the desired ignition timing for each value of the engine operating parameter, and ignition means, for firing at least one spark plug connected to the function generator to receive as input the output thereof to control the timing of the ignition means in dependence on the parameter.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENTS

Figure 1:
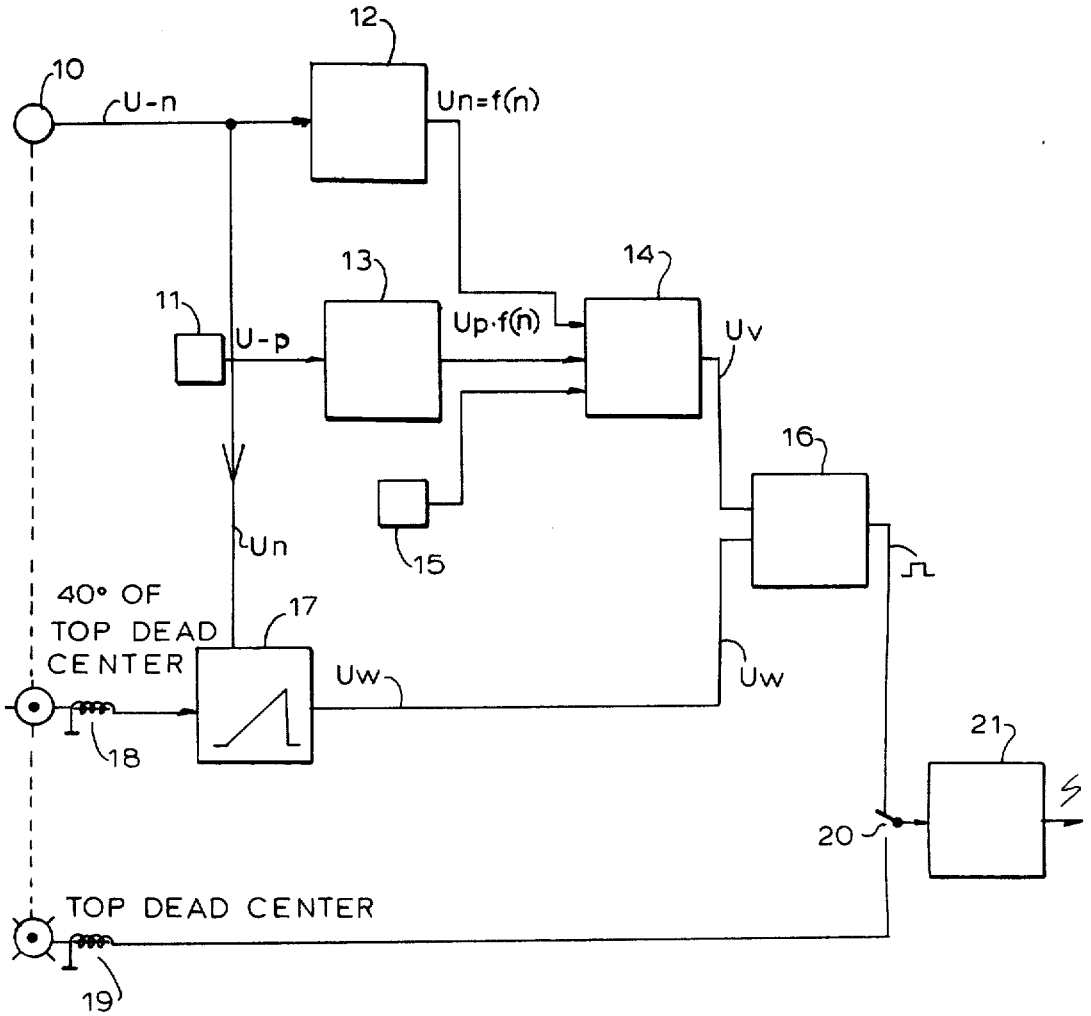
FIG. 1 is a block diagram of a first embodiment of the invention.

With reference to the embodiment shown in FIG. 1, there are provided two transducers or pickups 10 and 11 for providing voltages respectively proportional to the engine r.p.m. and to the throttle valve vacuum, the resulting signals being conducted to the respective function generators [11] *13* and 12. Transducer or pick-up 10 may be a conventional tachometer generator operative for producing a D.C. voltage whose level is proportional to engine r.p.m.

Transducer or pick-up 11 is entirely conventional. It may for instance comprise a diaphragm-arrangement positioned in the air-intake manifold with a linkage rod connected at one end to the diaphragm and at the other end to the movable tap of a potentiometer. As the pressure in the air-intake manifold varies, so also does the position of the diaphragm and thus the linkage rod moves the movable tap of the potentiometer. Such diaphragm-type pressure sensors are extremely common in this art and are not believed to require further explanation or illustration. Since the relationship between the engine r.p.m. n or between the throttle valve vacuum p and the ignition timing is not linear, the function generators 12 and 13, in dependence upon the input signals received from pickups 10 and 11 produce at their outputs signals corresponding to the desired ignition timing. Function generators 12 and 13 may be simple non-linear function generators of the type universally employed in analog computer technology. In entirely convention a manner they may each employ an operational amplifier having at its input a diode-resistor network for the synthesis of a piecewise-linear non-linear network. One such function generator is shown in "Amplifier Handbook" edited by Richard F. Shea and published by McGraw-Hill Book Company, New York, 1966. On page 26–38 of that handbook, in FIG. 66, there is shown a diode-resistor operational-amplifier network. As the input voltage varies, different ones of the input diodes become conductive so that the input resistance of the amplifier changes in dependence upon the input voltage. Accordingly, a piecewise-linear non-linear transfer function can be generated. In the case of the circuit just alluded to, the non-linear transfer function is a logarithmic one, that is, the output voltage is proportional to the logarithm of the input voltage. However, by appropriate selection of the breakdown voltages of the diodes and the resistor values, any desired non-linear transfer function can be achieved, according to principles fundamental in the analog-computer industry. The exact non-linear transfer function provided by the function generators 12 and 13 in applicants' FIG. 1 is not essential for the invention, and will be selected in accordance with the type of engine involved and the application to which it is put. The person of ordinary skill in the art will be familiar with the empirical procedures employed for choosing a desired functional relationship between the ignition timing and the engine-operating conditions to be taken into account. The electrical output of the function generator 12 is a voltage Un that is a function of the engine r.p.m. n: $Un=f(n)$. The electrical output of the function generator 13 is a voltage Up that is a function of the throttle valve vacuum: $Up=f(p)$. The output voltages of these two function generators are conducted to an adder 14. The adder 14 may be of the conventional operation-amplifier type having a feedback resistor connected across the amplifier input and output and a plurality of input resistors, one for each input of the adder, for instance as described in the textbook "Principles of Control Systems Engineering," by Del Toro and Parker, McGraw-Hill Book Company New York, 1960, page 545. Additional function generators, such as the function generator 15, can be connected to the adder 14. Additional function generator 15 may for instance comprise a temperature-dependent resistor, or a temperature-dependent resistor connected in series with an ordinary resistor to form a voltage divider having a temperature-dependent tap-voltage. Such arrangements are well known in the art and are not believed to require illustration. For setting the ignition timing, the additional function generators can supply electric signals corresponding to other engine operating parameters, such as the setting of the throttle valve, the engine temperature, air pressure, and humidity of the air. All of the input voltages of the adder 14 are combined to form an output voltage Uv that corresponds to the desired ignition timing as determined by the totality of the engine parameters that are taken into account. The output voltage Uv is conducted to a first input of an electronic comparator 16. As explained in U.S. Pat. No. 3,054,910, column 1, lines 20–32, "A voltage comparator is a type of non-linear circuit employed to ascertain the exact time at which an input signal, which may be an arbitrary waveform, attains a reference voltage level . . . Frequently, the output of a comparator circuit is a large amplitude, short-duration pulse, whatever the input signal waveform may be, which occurs at the instant the input signal voltage amplitude reaches the reference voltage and is otherwise independent of the input signal." It is possible to use the particular voltage comparator disclosed in U.S. Pat. No. 3,054,910 in the arrangement of the present invention; however, any other equivalent circuit will do. If the comparator of U.S. Pat. No. 3,054,910 is employed, then the bases of transistors 1 and 2 in FIG. 1 of U.S. Pat. No. 3,054,910 would respectively correspond to the lower and upper inputs of the schematic-circuit block 16 in FIG. 1 of applicants' drawing. The other input of the comparator is connected to an electric signal Uw that corresponds to the ignition adjustment of the distributor. When the voltages at the two inputs of the comparator 16 are equal, the comparator delivers a pulse, causing operation of the ignition device 21. The ignition adjustment of the distributor is obtained from a saw tooth generator 17, which is set into operation by a pulse generator 18 that, in the present embodiment, delivers a pulse 40° before top dead center. The pulse generator 18 is coupled to the crank shaft. From the moment that the saw tooth generator 17 is set into operation, its output voltage Uw rises at a rate proportional to the time t and the engine r.p.m. n. Information as to the engine r.p.m. is obtained from the pickup 10. Consequently, the voltage Uw is proportional to nt. The angle through which the distributor shaft (or the crank shaft) turns is $W=t/T$, where T is the time for one complete rotation of the distributor shaft (or the crank shaft). Thus, Uw is proportional to nTW. Since the product nT is one, the output voltage Uw of the saw tooth generator 17 is proportional to the angular position W and therefore independent of the engine r.p.m. n. With the function of sawtooth generator 17 thus defined, the person of ordinary skill in the art will have no difficulty in selecting the circuit for implementing that function. Reference is made, for instance, to the elementary textbook "Pulse, Digital and Switching Waveforms" By Millman and Taub, published by McGraw-Hill Book Company, New York, 1965, Section 14–7, bridging pages 528 and 529 of that textbook. In FIG. 14–13 (a) on page 529 thereof there is illustrated a constant-current sweep circuit suitable for use as the sawtooth generator 17. In that textbook is illustrated on page 529 a grounded-base transistor with a series connection of a resistor $R_e$ and voltage source $V_{EE}$ connected directly across the base emitter junction and a series connection of a capacitor and a voltage source $V_{CC}$ connected directly across the collector-base junction, and a switch S connected directly across the capacitor. As stated at the bottom of page 528 of that textbook, the transistor or capacitor-charging current is equal to $(V_{EE}-V_{EB})/Re$. Since $V_{EB}$ is negligible compared to $V_{EE}$, the slope of the capacitor voltage (i.e., of the sawtooth) can be made proportional to speed by replacing battery $V_{EE}$ with an ordinary tachometer arrangement which furnishes a steady-value D.C. voltage proportional to speed. A suitable cam arrangement coupled to the engine crankshaft can be used for closing and opening the discharging switch at the appropriate time, to initiate and then reinitiate the sawtooth-shaped pulse. The circuit just referred to is only exemplary; any such circuit will do for the purposes of the present invention, and the person of ordinary skill in the art may pick and choose that one which is most conveniently available to him.

At low and rapidly fluctuating engine speeds, such as occur when starting, the saw tooth generator 17 will not operate satisfactorily and will not deliver a sufficiently accurate output signal Uw. For this reason, there is provided a further inductive pulse generator 19 that delivers a pulse at the top dead center of the crank shaft, this pulse directly causing operation of the ignition device 21. An r.p.m. dependent switch 20 connects the igniting means 21 to the pulse generator 19 in a first, lower, range of engine speed and to the output of the comparator 16 in a second, higher, range of engine speeds. In the appended claims the components 17, 18 are referred to as first means for generating a first variable electrical signal indicative of crankshaft position, and components 10–15 are referred to as second means for generating a second electrical signal indicative of a crankshaft position at which an ignition spark is to be produced.

Figure 2:
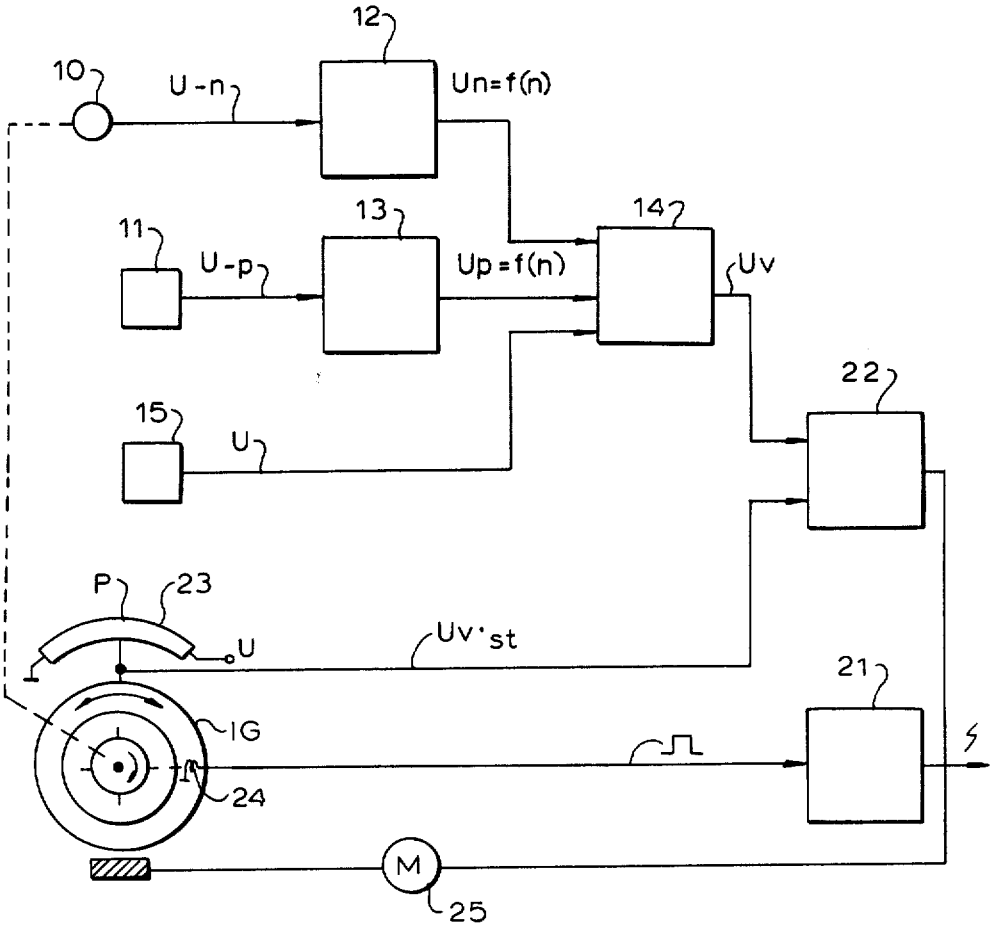
FIGS. 2, 3 and 4 are block diagrams of three further embodiments of the invention.

A second embodiment is shown in FIG. 2. The pickups 10 and 11 for the engine r.p.m. n and for the pressure p are connected to the function generators 12 and 13, which are connected to the adder 14. Also connected to the adder 14 is a further function generator 15 influencing the ignition timing in accordance with some other engine operating parameter. The electric output Uv of the adder is connected to one input of a servo control 22, the other input of which is connected to the tap of a potentiometer 23. The purpose of the potentiometer 23 is to indicate the timing adjustment of a pulse generator 24. The servo control 22 compares the electric output of the adder 14, which is the desired value, with the voltage on the tap of the potentiometer 23, which is the actual value, and, depending on this comparison, operates a servo motor 25 to change the timing adjustment by rotating the pulse generator 24. This rotation continues until the two voltages Uv and Uv ist at the two inputs of the servo control 22 are equal. In this embodiment, the ignition device 21 is operated directly by the inductive pulse generator 24 which is mounted in the neighborhood of the distributor shaft.

Figure 3:
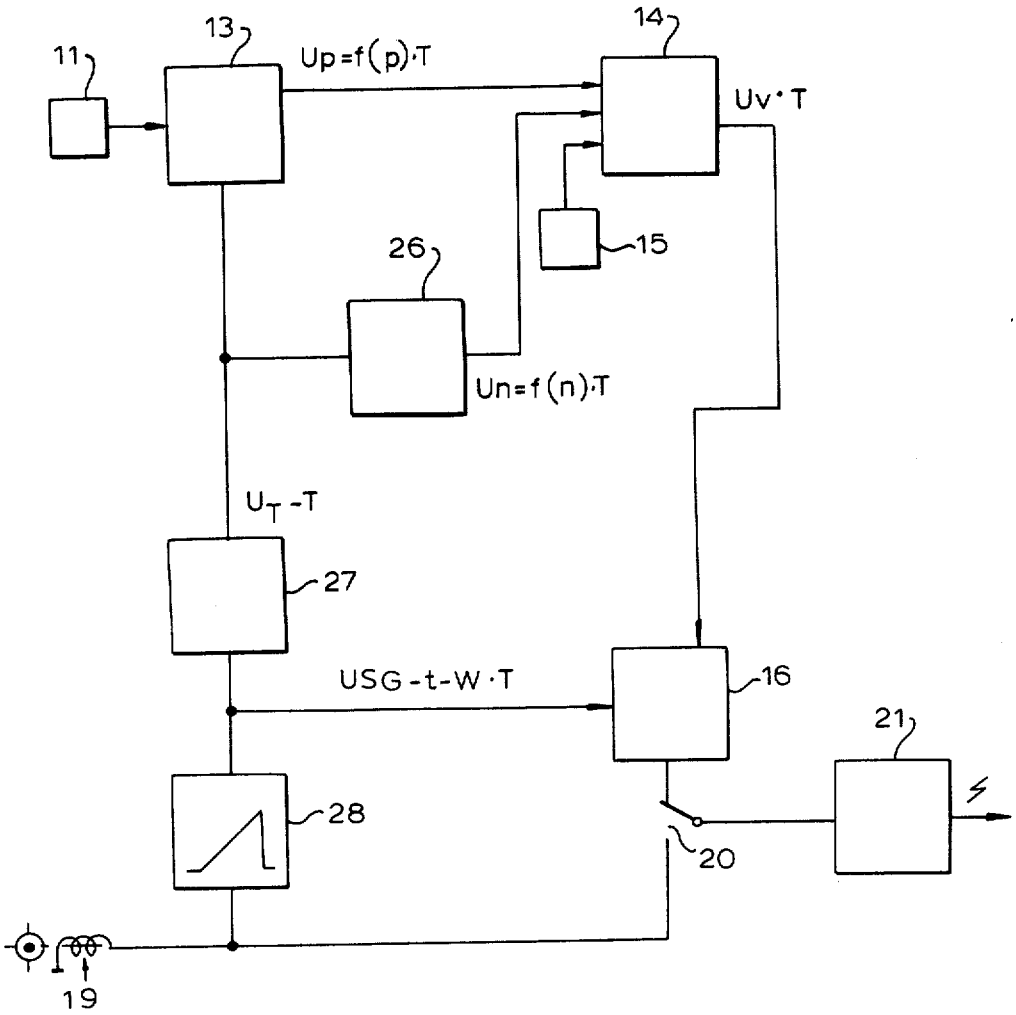

In the third embodiment, shown in FIG. 3, fewer pickups are used than in the two previous embodiments. The single pickup 11 in this embodiment is connected to the input of the function generator 13, the output of which is connected to the adder 14, another input of which latter is connected to a function generator 26, which is connected by a peak readout memory or maximum store 27 to a saw tooth generator 28. There can be provided a third function generator, connected to the third input of the adder 14, for influencing the ignition timing in dependence upon some other engine operating parameter. The input of the saw tooth generator is connected to the pulse generator 19, the output of the saw tooth generator being connected both to the maximum store 27 and to the electronic comparator 16. The output of the maximum store 27 is connected not only to the function generator 26 but also to the function generator 13. The saw tooth generator 28 is started by the pulse generator 19. In contradistinction to the embodiment shown in FIG. 1, the output of the saw tooth generator rises only in proportion to the time t (USG is proportional to t). Since the angle W through which the crankshaft turns is t/T, the electric output USG of the saw tooth generator 28 is proportional to WT and is applied to the input of maximum store 27 and also to the input of maximum store 27 and also to the input of comparator 16. Thus, the angle W is multiplied by the period T. Again to ensure that the spark plugs are fired at a predetermined angle W independent of the period T, the electric output of the adder 14 must be multiplied by T. When the voltages at the two inputs of the comparator 16 are equal, the output USG of the saw tooth generator 28 is equal to UvI, where Uv corresponds to the output voltage of the adder 14. Since the output voltage USG of the saw tooth generator 28 is proportional to UT, the angle W is proportional to the output voltage Uv of the adder 14. Thus, the expression T is eliminated. The indicated multiplication by T is carried out in the function generators. The r.p.m. dependent function generator 26 must receive as input signals the engine r.p.m. n and the period T. Since the r.p.m. n is equal to 1/T, the r.p.m. is not necessary and the pickup for the r.p.m. can be discarded. However, the period T must be obtained. A voltage UT proportional to the period T can be extracted from the output USG of the saw tooth generator, since USG max is proportional to T. For this purpose, the maximum store 27 stores each new maximum value of USG.

In this embodiment, as well as in the embodiment shown in FIG. 1, the pulse generator 19 directly operates the ignition device 21 at low engine r.p.m.—s.

Figure 4:
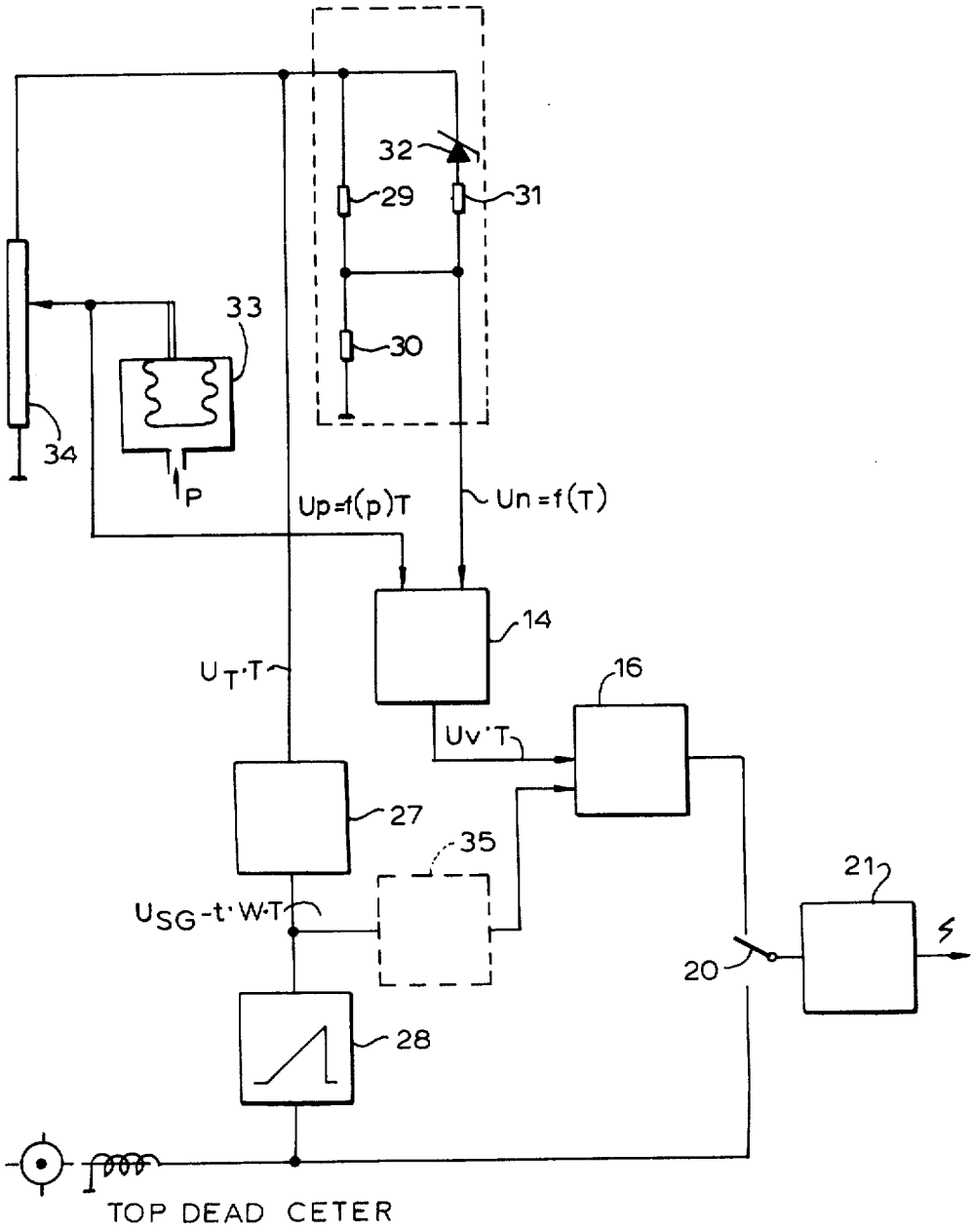

To make the afore-described embodiments suitable for installations on a large scale in motor vehicles, the adjustable function generators 13 and 26 are replaced by fixed function generators. FIG. 4 shows one such embodiment. The r.p.m. dependent function generator 26 is designed as a voltage divider of which the divider ratio is dependent on the input voltage $U_r$ of the voltage divider. The function generator comprises a fixed voltage divider having resistors 29 and 30 of which the resistor 29 is shunted by a resistor 31 and a zener diode 32 connected in series. The pickup for obtaining the throttle valve vacuum p can consist of a bellows 33 that moves the tap of a non-linear resistor 34 that is connected across the voltage $U_r$. Since the vacuum p is a function of the engine r.p.m. n and of the position of the throttle valve, the latter can be used in place of the vacuum.

In the embodiments shown in FIGS. 3 and 4, the function generator 26, shown within the broken line box in FIG. 4, can be connected between the saw tooth generator 28 and the comparator 16. In accordance with the invention, an additional function generator 35 can be connected between the generator 28 and the comparator 16, as shown by the broken line box in FIG. 4.

The advantages of the invention described are that they enable a completely free adjustment of the characteristic curves according to which the ignition timing is varied. The curves can be changed at will while the engine is operating. To do this all that is required is a simple distributor with pulse generators. Sensitive ignition timing measuring devices or mechanical arrangements are not necessary.

In certain applications of the invention, it is advantageous to use generators with an exponential function output, or other output that varies with time, instead of the saw tooth generators 17 or 28.

It will be understood that each of the elements described above or two or more together, may also find a useful application in other types of circuits differing from the types described above.

While the invention has been illustrated and described as embodied in arrangements for electronically determining and adjusting the ignition timing of an internal combustion engine, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims.

We claim:

1. An ignition arrangement for internal combustion engines, comprising in combination first means for generating a first variable electrical signal absolutely indicative of crankshaft position; second means for generating as a function of at least one engine operating variable a second variable electrical signal indicative of a crankshaft position at which an ignition spark is to be produced; comparator means for comparing said first and second signals and for generating an ignition signal when the crankshaft position indicated by said first signal corresponds to the crankshaft position indicated by said second signal; and igniting means for producing an ignition spark in response to generation of said ignition signal.

2. An arrangement as defined in claim 1, wherein said first means comprises means for generating a saw-tooth waveform each pulse of which is initiated at a fixed time relative to the combustion cycle and has a slope proportional to engine speed.

3. An arrangement as defined in claim 1, wherein said second means comprises means for generating said second signal as a function of a plurality of engine operating variables.

4. An arrangement as defined in claim 1, wherein said second means comprises means for generating said second signal as a function of engine speed.

5. An arrangement as defined in claim 1, wherein said second means comprises means for generating said second signal as a function of engine speed and accelerator position.

6. An arrangement as defined in claim 1, wherein said second means comprises a plurality of transducers for generating respective electrical monitoring signals indicative of said operating variables, and plurality of function generators each associated with one of said transducers for producing a respective output signal as a respective predetermined function of the respective monitoring signal, and adder means for generating said second signal as the sum of said output signals.

7. An arrangement as defined in claim 1, wherein said second means comprises means for generating said second signal as a function of engine speed and throttle-valve vacuum.

8. An arrangement as defined in claim 1, wherein said second means comprises means for generating said second signal as a function of temperature.

9. An arrangement as defined in claim 1, wherein said second means comprises means for generating said second signal as a function of engine speed and throttle-valve position.

10. An arrangement as defined in claim 1, and further including means for applying to said igniting means ignition signals at predetermined unvarying angular positions of the crankshaft when the engine speed falls below a predetermined value.

11. An arrangement as defined in claim 1, wherein said second means comprises means for generating said second signal as an adjustable function of at least one engine operating variable.

12. An arrangement as defined in claim 1, wherein said second means comprises means for generating said second signal as an adjustable function of a plurality of engine operating variables.

13. An ignition arrangement for internal combustion engines, comprising in combination first means for generating a first variable electrical signal indicative of crankshaft position independently of engine speed; second means for generating as a function of at least one engine operating variable a second variable electrical signal indicative of a crankshaft position at which an ignition spark is to be produced; comparator means for comparing said first and second signals and for generating an ignition signal when the crankshaft position indicated by said first signal corresponds to the crankshaft position indicated by said second signal; and igniting means for producing an ignition spark in response to generation of said ignition signal.

* * * * *